Oct. 10, 1961 R. W. REACH, JR., ET AL 3,003,695

DATA PROCESSING APPARATUS

Filed Oct. 1, 1959 3 Sheets-Sheet 1

ORDER OF THE BITS IN A PARALLEL-SERIAL REGISTER
(ONCE EVERY 12 PULSE PERIODS)

ORDER OF BITS IN A PARALLEL-SERIAL-PARALLEL REGISTER
(ONCE EVERY 4 PULSE PERIODS)

INVENTORS.
Roy W. Reach, Jr.
and William M. Kahn,
BY Bair, Freeman & Molinare
ATTORNEYS.

INVENTORS:
Roy W. Reach, Jr.
and William M. Kahn,
BY Bair, Freeman & Molinare
ATTORNEYS.

A PARALLEL-SERIAL-PARALLEL ACCUMULATOR (48 BITS)

INVENTORS:
Roy W. Reach, Jr.
and William M. Kahn,
BY Bair, Freeman & Molinare
ATTORNEYS.

1

3,003,695
DATA PROCESSING APPARATUS

Roy W. Reach, Jr., Sudbury, and William N. Kahn, Brighton, Mass., assignors to Minneapolis-Honeywell Regulator Company, Minneapolis, Minn., a corporation of Delaware Filed Oct. 1, 1959, Ser. No. 843,719
19 Claims. (Cl. 235—175)

This invention relates generally to improvements in data processing apparatus, and more particularly to new and improved circuits for handling, storing, and transferring digital data where the circuits are characterized by the economy of apparatus utilized and by their relatively fast speeds of operation.

In choosing an arrangement for the storage of digital data in data processing apparatus, as for example in the manipulative reigsters of a binary digital computer system, many factors must be considered. These factors include speed required, economy, reliability, compatibility with related equipment, and the capability of the logical building blocks available. To date, the most popular arrangements for the storage of binary digits of bits in the various manipulative registers of the prior art are parallel, serial, and parallel-serial.

As known by those skilled in the art, a parallel system can be one in which each bit of a machine word is stored in a bistable device, forming a register which has inputs and outputs associated with each bit simultaneously available for transfer or modification. A serial system can be one in which the bits of a machine word are stored in such a manner that each bit is available sequentially and singly, either high order to low order or vice versa, one bit following the other. A parallel-serial system can be one in which the bits of a machine word are separated into a number of small serial sub-registers. If the machine word is divided into a number of characters, each of which has an equal number of bits, and if the corresponding bits in each character are stored in a serial register in such a way that all bits in a given character are available simultaneously, one character at a time, the system is known as parallel-serial.

A parallel system has the advantage that transfers can be effected rapidly since no delay is encountered in waiting for bits to be available in contrast to non-parallel systems in which the register input and/or output points are limited. Also, parallel adders can be constructed with faster add times, in general, than can known serial systems using analogous elements with similar electrical characteristics.

A serial system, on the other hand, requires a complete word cycle (the repetition time required for a circulating bit to return to a given point in the register) to effect a transfer to similar serial register or to effect the addition of two numbers. Also, it can be shown that two word cycles are required for a complete addition with end round carry. A serial system however, has the advantage that all bits to be added can pass through the same adder stage, and therefore, only one such adder circuit and its associated control circuitry are required.

In comparing storage economies between parallel and serial systems, those skilled in the art understand that there exists for any given storage delay line an optimum number of bits per serial register where the cost per bit stored is reduced to a minimum figure as dictated for example, by the specifications on the total percentage tolerance, total rise time to delay ratio and total attenuation. Thus, the total register can be broken up into a number of small serial registers, each one storing a so-called optimum number of bits, and it can be shown that the storage cost of a serial system consisting of a parallel connection of the small optimum sections of reshape

2 amplifiers and delay lines is the same as the storage cost of a parallel-serial system or any other non-parallel system consisting of various connections of the small sections.

Those skilled in the art also understand that the addition speed of a parallel-serial register is greater than that of a serial register, although the former is somewhat limited by the restriction that the entire sum of a character together with its carry must be available within one clock time. In a parallel system, the transfers can be effected very rapidly, and as the sum without carries requires no more time than a transfer, the addition time of a parallel system is limited generally by the carry propagation requirements. It can be shown that using similar logical elements, the maximum add time for a parallel system is more than twice as fast as the maximum add time with a parallel-serial system.

Accordingly, it is a general object of this invention to provide new and improved data processing apparatus which combines the advantages of the various different types of prior art systems and which operates in accordance with a parallel-serial-parallel arrangement.

It is another object of this invention to provide such a parallel-serial-parallel system which advantageously retains the economies of optimum storage cost per bit.

It is still another object of this invention to provide a parallel-serial-parallel data processing arrangement which achieves the fastest transfer time possible under the restrictions of optimum storage cost per bit. More specifically, each reshape amplifier and associated delay advantageously is arranged as an independent storage element, each storing the optimum number of bits, thereby forming the total register of a number of serial sub-registers.

It is a further object of this invention to provide a parallel-serial-parallel arrangement in which the bits of the machine word are assigned in a unique manner to the individual serial sub-registers, as described above, to give add times comparable to a fixed cycle parallel adder constructed of similar logical elements.

It is a still further object of this invention to provide such a parallel-serial-parallel system which is completely compatible with the other registers and equipment of the data processing system.

It is a still further object of this invention to provide a parallel-serial-parallel data processing system having the advantages recited above wherein the cost of performing shift, logical AND, logical OR, compare and other functions is comparable with that of existing data processing systems.

The above and other objects may be realized as illustrated by a specific illustrative embodiment of the invention wherein the basic machine words will be assumed as comprising 48 bits. In accordance with a feature of this invention, the bits of the word adjacent in order are divided into several groups of bits each containing the same number of bits. These groups of bits are called major characters, and each major character similarly is divided into a number of smaller characters known as minor characters. The bits of each major character advantageously are stored in small serial registers in such a way that all bits of a minor character are available simultaneously.

For example, in an illustrative parallel-serial-parallel arrangement constructed in accordance with the invention and having a basic machine word size of 48 bits, the bits first are divided into three major characters each having 16 bits, and each major character is divided into four minor characters each having four bits.

The parallel-serial-parallel apparatus advantageously comprises 12 four bit serial sub-registers, and a set of minor characters, one for each of the major characters, is available at a given time for transfer or modification. The name "parallel-serial-parallel" given to the invention described herein is derived from the fact that the word is stored in a number of parallel, parallel-serial registers.

In one preferable embodiment of parallel-serial-parallel apparatus, disclosed in detail hereinafter, the serial sub-registers are arranged to provide addition of the minor characters with suitable carry functions. In the specific illustrative accumulator disclosed herein, three four-bit parallel adder stages are provided, one for each major character, such that the addition of the minor characters in each major character is effected in each adder stage. Each major character addition, then, is implemented as parallel-serial with the end carry from each major character fed end-around, at the proper time, into the next major character with the result that the adder speed for the parallel-serial-parallel adder is much closer to parallel adder speed rather than parallel-serial adder speed.

In accordance with a further feature of the invention, the parallel-serial-parallel adder speed is improved by taking advantage of another type of carry anticipation. At the end of the first addition word cycle, the sum of each major character without carry from other major characters is complete, and the first carry (if any) from each major character is available. This carry goes into the next major character unconditionally. However, a carry from any major character at the end of the second word cycle can only be obtained if that character is one less than the number corresponding to the radix of that character at the end of the first word cycle and there was a carry from the preceding major character.

Similarly, there can be a carry from a given major character at the end of the third word cycle only if at the end of the first word cycle that character contained a number one less than the radix of that character, the preceding major character contained a number one less than the radix, and there was an end carry from the second preceding major character. Accordingly, it is a highly advantageous feature of the invention to provide a parallel-serial-parallel accumulator wherein the complete carry anticipation status is generated by inspecting each major character for a number corresponding to one less than the radix for that major character, and by the availability of the major character carries.

In accordance with a further feature of the invention, the parallel-serial-parallel principles are utilized for the comparison of two numbers stored in parallel-serial-parallel registers. In the comparison of two machine words each being 48 bits long, the bits may be compared twelve at a time for four successive pulse periods to complete the comparison in essentially one word cycle wherein a single output represents equality or the relative magnitude of the entire words compared.

With the above and further objects in view, the invention consists in the construction, arrangement and combination of the various parallel-serial-parallel systems as hereinafter more fully set forth. The various features of novelty which characterize the invention are pointed out with particularity in the claims annexed to and forming a part of this specification. For a better understanding of the invention, however, and its advantages, reference is had to the accompanying drawing and descriptive matter in which are illustrated and described several illustrative embodiments of the invention.

Figure 1:
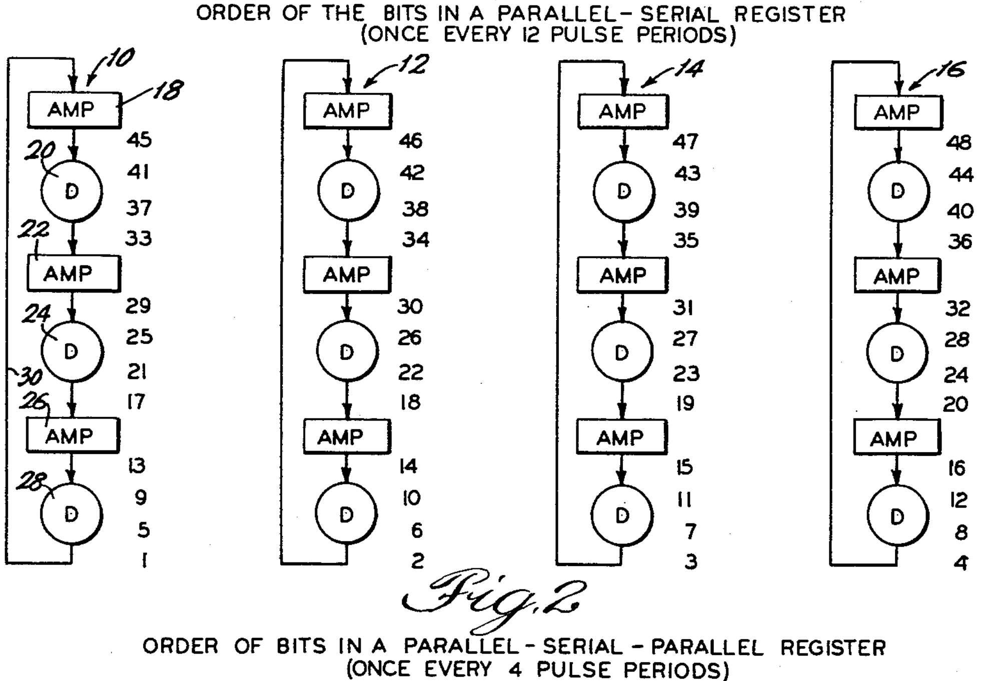
FIGURE 1 illustrates the bit distribution of a 48 bit machine word stored in a parallel-serial register in accordance with prior art practices.

Referring now to the drawing, and more particularly to FIGURE 1 thereof, there is illustrated the manner in which the bits are arranged in a parallel-serial register of the type known in the prior art. It can be seen from FIGURE 1 that in such parallel-serial systems the bits of the machine word are divided into a number of four bit characters, 1,2, 3, 4, and 5; 6, 7, 8, and 9; etc., and these bits are separately positioned in a number of small serial sub-registers such that all four bits of a given character are available simultaneously.

For example, in a machine word comprising 48 bits as shown in FIGURE 1, the parallel-serial register is divided into four serial sub-registers, each adapted to process 12 bits of the machine word. Serial sub-register 10 is shown as comprising an amplifier 18 having a delay device 20 at the output thereof, which in turn feeds its output into the amplifier 22. Similarly, the amplifier 22 applies its output to the delay device 24, which in turn feeds its output to the amplifier 26. Amplifier 26 applies its output to the delay device 28 which, through the feedback line 30 feeds its output back into the input of the amplifier 18. If each delay device is formed with a four pulse period delay, four bits can be stored in each amplifier and delay line section, and since three such sections are provided, the serial sub-register 10 is adapted to store 12 bits of the machine word.

In accordance with known techniques for parallel-serial registers, the corresponding bits in each character are stored in the serial sub-register in such a way that all four bits of a given character are available simultaneously, such that one four bit character can be processed at a time.

In the specific example of FIGURE 1, the first four bit character (comprised of bits 1, 2, 3, and 4) of the 48 bit machine word is stored in corresponding positions in the serial sub-registers 10, 12, 14 and 16, respectively; the second four bit character (comprised of bits 5, 6, 7 and 8) is correspondingly stored in the serial sub-registers 10, 12, 14 and 16, respectively; etc.

One of the inherent limitations of the parallel-serial system can now be appreciated from the FIGURE 1 illustration in that each four bit character of the 48 bit machine word is available for processing only once every 12 pulse periods.

In sharp contrast to the inherent limitations of the parallel-serial system described above, the parallel-serial-parallel system of the present invention divides the number of bits that must appear simultaneously into essentially an optimum number of groups. Thus, the bits of the machine word adjacent in order first are divided into a plurality of characters each containing the same number of bits. These groups of bits are called major characters and each major character similarly is divided into a smaller number of characters known as minor characters. The bits of each major character are stored in small serial sub-registers in such a way that all of the minor characters, one for each of the major characters, are available at a given time for transfer or modification. It can now be appreciated that the name given to the system "parallel-serial-parallel" is derived from the fact that the machine word is stored in a number of parallel, parallel-serial registers.

Figure 2:
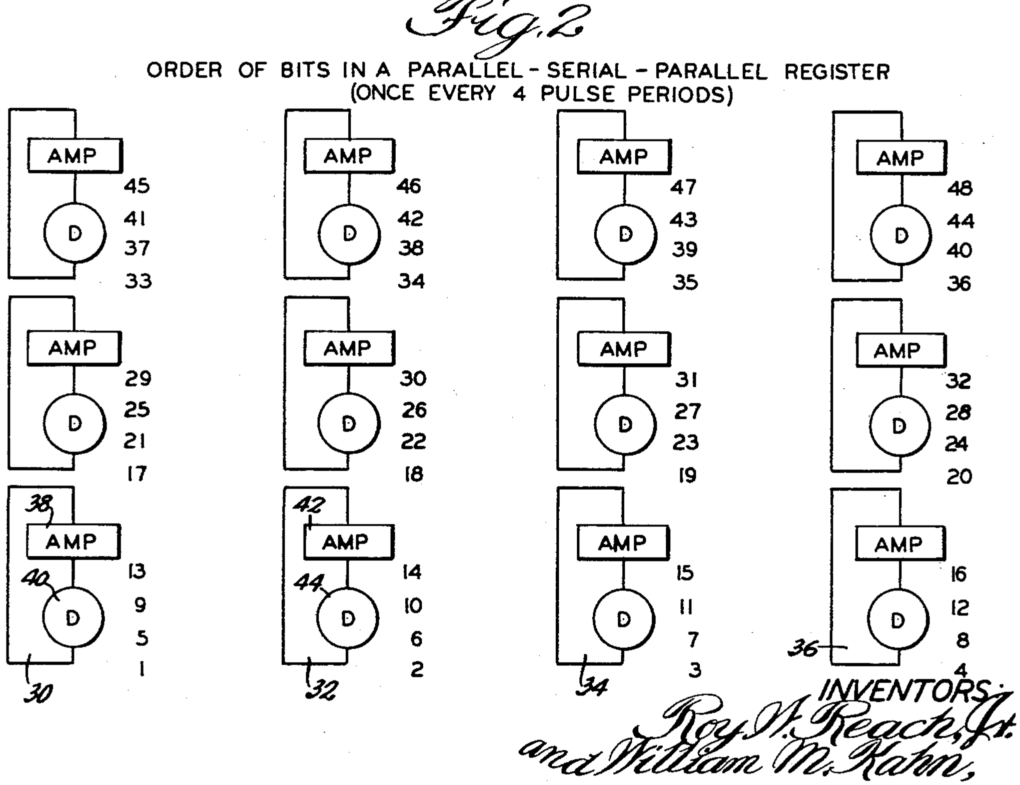
FIGURE 2 illustrates the bit distribution of a 48 bit machine word stored in a parallel-serial-parallel register in accordance with the present invention.

If, as assumed above, the machine word is comprised of 48 bits, then each major character may comprise 16 bits divided into four minor characters of four bits each. Such an arrangement involves 12 four bit serial sub-registers, as illustrated in FIGURE 2. For example, major character 1 comprises 16 bits, namely, bits numbered 1–16. These bits are stored in the serial sub-registers 30, 32, 34 and 36, in groups of four bits each, with the corresponding bits forming each minor character being available simultaneously so that one minor character may be processed at a time for each major character.

Serial sub-register 30 comprises one amplifier delay section, including the amplifier 38 and the delay device 40, and is adapted to store bits numbered 1, 5, 9, and 13. Similarly, serial sub-register 32 comprises amplifier 42 and delay device 44 and is adapted to store bits numbered 2, 6, 10 and 14. The remaining two amplifier delay sections 34 and 36 of major character 1 are constructed in a similar fashion and are adapted to store bits numbered 3, 7, 11, 15, and 4, 8, 12, 16, respectively. In a similar fashion, four amplifier delay sections are provided for major character 2, and four amplifier delay sections are provided for major character 3, each major character comprising four minor characters of four bits each.

In all, twelve similarly constructed amplifier delay sections are provided, each adapted to store four bits such that the corresponding bits of one minor character in each of the three major characters are available once every four pulse periods. Those skilled in the art realize that this represents a marked improvement in speed of operation and care of handling over the parallel-serial system described and shown in FIGURE 1.

The assignment of the bits of a 48 bit machine word to a parallel-serial-parallel register containing 12 four bit serial sub-registers are set forth in the following chart so that the division of the bits into major and minor characters may be fully understood. Such an arrangement of bits permits full compatibility with the development of a parallel-serial-parallel adder circuit, as described in greater detail hereinafter.

| | Serial Sub. Reg. #4 | Serial Sub. Reg. #3 | Serial Sub. Reg. #2 | Serial Sub. Reg. #1 |
|---|---|---|---|---|
| Minor Ch. #1 | P4 | P3 | P2 | P1 |
| Minor Ch. #2 | P8 | P7 | P6 | P5 Major Character #1. |
| Minor Ch. #3 | P12 | P11 | P10 | P9 |
| Minor Ch. #4 | P16 | P15 | P14 | P13 |

| | Serial Sub. Reg. #8 | Serial Sub. Reg. #7 | Serial Sub. Reg. #6 | Serial Sub. Reg. #5 |
|---|---|---|---|---|
| Minor Ch. #5 | P20 | P19 | P18 | P17 |
| Minor Ch. #6 | P24 | P23 | P22 | P21 Major Character #2. |
| Minor Ch. #7 | P28 | P27 | P26 | P25 |
| Minor Ch. #8 | P32 | P33 | P30 | P29 |

| | Serial Sub. Reg. #12 | Serial Sub. Reg. #11 | Serial Sub. Reg. #10 | Serial Sub. Reg. #9 |
|---|---|---|---|---|
| Minor Ch. #9 | P36 | P35 | P34 | P33 |
| Minor Ch. #10 | P40 | P39 | P38 | P37 Major Character #3. |
| Minor Ch. #11 | P44 | P43 | P42 | P41 |
| Minor Ch. #12 | P48 | P47 | P46 | P45 |

In accordance with a feature of this invention, the principles outlined above advantageously may be utilized in the construction of a parallel-serial-parallel adder. Such an adder retains the economies of optimum storage space per bit, and to achieve the fastest transfer time possible under these conditions each reshape amplifier and associated delay is formed as an independent storage section storing the so-called optimum number of bits. This results in a total register comprising a number of small serial sub-registers. Advantageously, bits of the machine word are assigned to the small serial sub-registers in a manner that gives addition times comparable to that of a fixed cycle parallel adder constructed of the same type of logical elements.

With the machine word divided into a number of major characters and minor characters, as illustrated in Chart 1, each major character addition can then be implemented as parallel-serial. If the end carry from each major character is fed into the next major character, end-around, then $Nn+1$ represents the maximum number of word cycles required to obtain the sums and to propagate all carries, where $Nn$ is equal to the number of major characters.

Figure 3:
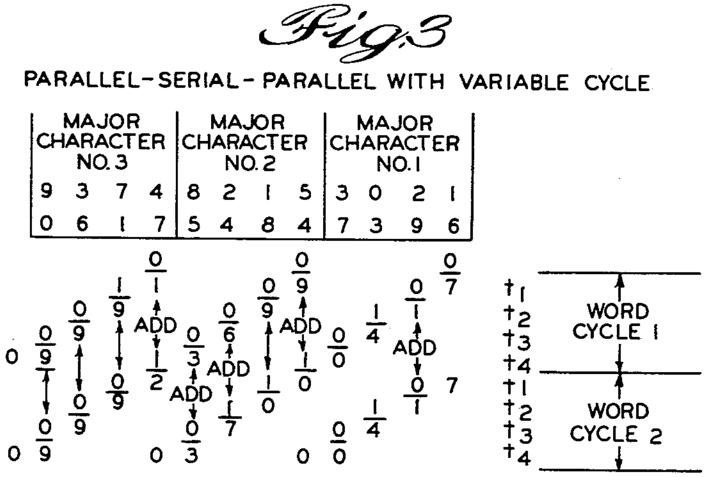
FIGURE 3 illustrates the operation of the parallel-serial-parallel system of the invention with carry anticipation.

Reference is now made to FIGURE 3 of the drawing which illustrates one type of addition provided by a parallel-serial-parallel adder constructed in accordance with the invention. Two machine words A and B are illustrated with words each comprising three major characters of four decimal digits each. In accordance with the principles explained above, with the machine word divided into three major characters of four decimal digits each, the maximum number of word cycles required for the complete addition including end around carry is equal to four, and in the specific illustrative example of FIGURE 3, the total add time including end around carry is equal to two word cycles of four pulse periods each. During the word cycle 1 at time $t1$, the lowest order decimal digits of each character are added with the carries, if any, being made available for the addition of the next higher order digits. At the end of four pulse periods, $t1$ through $t4$, of word cycle 1, the sum of the addition is present and the end-around carry is available for propagation during the next complete word cycle, namely, word cycle 2.

For example, the addition of the two highest order digits (7 and 3) in major character number 1, in the illustrative example of FIGURE 3, produces a carry which is fed, end around, to be added to the lowest order digits of major character number 2, and the addition of the two highest order digits of major character number 2 (8 and 5) has resulted in a carry which is fed end-around to be added to the lowest order digits of major character number 3. At the end of the word cycle number 2, the complete addition, including end-around carries, is finished since in the specific illustrative example of FIGURE 3 only two word cycles were required.

It will be understood by those skilled in the art that a carry from any major character at the end of the second word cycle in FIGURE 3 would be obtained only if the major character contained all decimal digit 9's at the end of the first word cycle and there also was a carry from the preceding major character. Similarly, there would be a carry from a major character at the end of the third word cycle only if at the end of the first word cycle that major character contained all decimal digit 9's, the preceding major character also contained only decimal digit 9's and in addition there was an end carry from the second preceding major character. Since these latter conditions are not present in the example of FIGURE 3, only two, and not three or four word cycles were required to complete the addition. This type of parallel-serial-parallel addition is entitled Variable Cycle since, with three major characters, the total addition time including end-around carry could vary from one to four word cycles dependent upon the value of the major character digits to be added.

In accordance with a further feature of this invention, an alternative form of parallel-serial-parallel addition can be effected by taking advantage of another type of carry anticipation. To understand this type of carry anticipation, consider the status of the parallel-serial-parallel adder at the end of the first word cycle after the addition is started. At this time, the sum of each major character without carry from other major characters is complete, and the first carry, if any, from each major character is available. The first carry goes into the next major character unconditionally. However, a carry from any major character at the end of the second word cycle can be obtained only if the major character is one less than the number corresponding to the radix of that character (all 9's in a decimal system or all binary ones in a binary system) at the end of the first word cycle, and there was a carry from the preceding major character. Likewise, there can be a carry from a given major character at the end of the third word cycle only if at the end of the first word cycle that character contained a number one less than the radix of that character, the preceding major character contained a number one less than the radix, and there was an end carry from the second preceding major character.

In a like manner, it can be shown that the complete carry anticipation status can be easily generated by inspecting each major character for the number corresponding to one less than the radix for that major character, and by the availability of the major character carries. Thus, in accordance with a principle of the invention, if the number of bits in a major character are sufficiently few to allow a simple gating to inspect for one less than the radix (all binary ones in a binary system or all nines in a decimal system) and if the number of all major characters is sufficiently few to allow the gating of the anticipated carries, then the complete addition can be finished in two word cycles.

A parallel-serial-parallel adder, whose speed approaches that of a parallel adder, may be constructed in accordance with the novel principles of this invention as discussed above, by utilizing the following procedural steps:

(1) Setting $t_{ae(p)}=t_{ae(psp)}$, obtain $$t_p\left(1+\frac{N}{NC}\right)=N\phi t_p\left(1+\frac{2N}{Np}\right),\quad 1=\frac{Np}{Nn(N\phi NC-2)}$$

$$N\phi=\frac{NC+N}{NC\left(1+\frac{2N}{Np}\right)}=\frac{(N+NC)}{NC(2N+Np)}Np \qquad (a)$$

(2) Choose N, NC, NS, and $t_p$ based on the system requirements, circuit capabilities, and optimum storage costs.

(3) Since the equality $$1=\frac{Np}{Nn(N\phi NC-2)}$$

must be met, set $$Nn=\frac{Np}{N\phi NC-2}=\frac{Np}{Ns(N\phi NC-2)} \qquad (b)$$

(4) Note that $$Ns=N/p \qquad (c)$$

(5) Solve Equation (*a*) in 1 above, for $N\phi$ as $f$(N, NC, and N*s*) and using the value of $N\phi$ found, solve (*b*) in 3 above for N*n*.

(6) Select a clock frequency such as that $$N\phi t_p=1/f=t_{rp}$$

Check to see that the circuit requirements are physically realizable.

(7) Break the word into N*n* major characters, and each major character into ($N\phi NC-2$) minor characters.

(8) Design N*n* parallel adders ($N\phi NC-2$) bits long, designed to obtain end carry in time to feed to the next character that will end carry in time to feed to the next character that will enter the adder at the next clock time.

(9) Sense every bit in each major character for binary one after one word cycle has transpired, and use this information in conjunction with major character end carries to anticipate all other carries.

Wherein:

$t_{ae}(p)$=the total addition time, including end around carries, in a parallel system;

$t_{ae}(psp)$=the total maximum addition time including end around carries in a parallel-serial-parallel system;

$t_p$=the transit time through one stage of an asynchronous system;

$N$=the total number of bits stored in a register;

$NC$=the number of carries handled simultaneously in an adder stage from previous stages;

$N\phi$=the number of clock phases in a totally clocked system;

$Np$=the number of parallel stages in a register;

$Ns$=the number of bits stored serially in one stage;

$trp$=the basic clock repetition period in a clocked system.

For purposes of illustration, assume that it is desired to construct an adder system whose basic word size is 48 bits long, ($N=48$) the optimum storage cost per bit dictates either four or six bits per sub-register ($Ns=4$ or 6), the maximum size logical structure is such that only two carries can be anticipated on the logical structure ($NC=2$), and whose transit time through one stage is 0.1 microsecond.

(A) Solve for $$N\phi=\frac{N+1}{NC(1+2NS)}=\frac{48+1}{2(1+8)}=\frac{49}{18}=2.7(Ns=4)$$

or $$N\phi=\frac{49}{2(1+12)}=\frac{49}{26}=1.9(Ns=6)$$

(B) Choose $$Nn=\frac{N}{Ns(N\phi NC-2)}=\frac{48}{4(3\times 2-2)}=\frac{48}{16}=3$$

$Nn=3$ for $Ns=4$, $Nn=4$ for $Ns=6$.

(C) Note that the add time for a parallel adder in this example is $$t_{ae}(p)=t_p\left(1+\frac{N}{NC}\right)=0.1\left(1+\frac{48}{2}\right)=2.5 \text{ microseconds}$$

and the add time for the parallel-serial-parallel adder is $t_{ae}(psp)=N\phi t_p(1+2N)$ $t_{ae}(psp)=0.3(1+8)=27$ microseconds for $Ns=4$ and $0.2(1+12)=2.6$ microseconds for $Ns=6$.

As seen above, the increase in add time to go from four pulse periods per sub-register to six pulse periods per sub-register is almost negligible. Also, since the pulse specification is $N\phi tp=3\times 0.1=0.3$ for the four pulse line, and is $2\times 0.1=0.2$ microseconds for the six pulse period line, the transfer times are equal for each $0.3\times 4=0.2\times 6=1.2$ microseconds. However, the frequency requirements for the six pulse line is more severe than that imposed on the four pulse line. Therefore, choose the four pulse line, $Ns=4$.

(D) Tabulating the parameters defined to now there is:

$N=48$
$Ns=4$
$Nn=3$
$Np=12$
$N\phi=3$
$Nc=2$ (E) Choose the basic clock time to be $$t_pN\phi=0.1\times 3=0.3$$

microsecond. Therefore, the basic clock frequency required for the electronic circuitry is 3.33 mc., which is within the realm of possibility for $t_p=0.1$ (F) Define the bits in the word as P1–P48, low order to high order. Then divide the 48 bit word into $Nn=3$ major characters of 16 bits each. Thus, major character 1 (MC1) contains bits P1–P16, MC2 contains bits P17–P32, and MC3 contains bits P33–P48. Each major character is divided into $Ns=4$ minor characters M1C1–M1C4, each of which contains 4 bits. Minor character 1 of major character 1 contains bits P1–P4 of the word. FIGURE 2 above shows the contents of the $Np=12$ serial sub-registers and the arrangement of bits therein to allow compatibility with the adder circuitry.

(G) Devise three four-bit parallel adder stages, one for each major character. Since $Nc=2$, there will be only two carry functions to implement, the other two being "anticipated."

Figure 4:
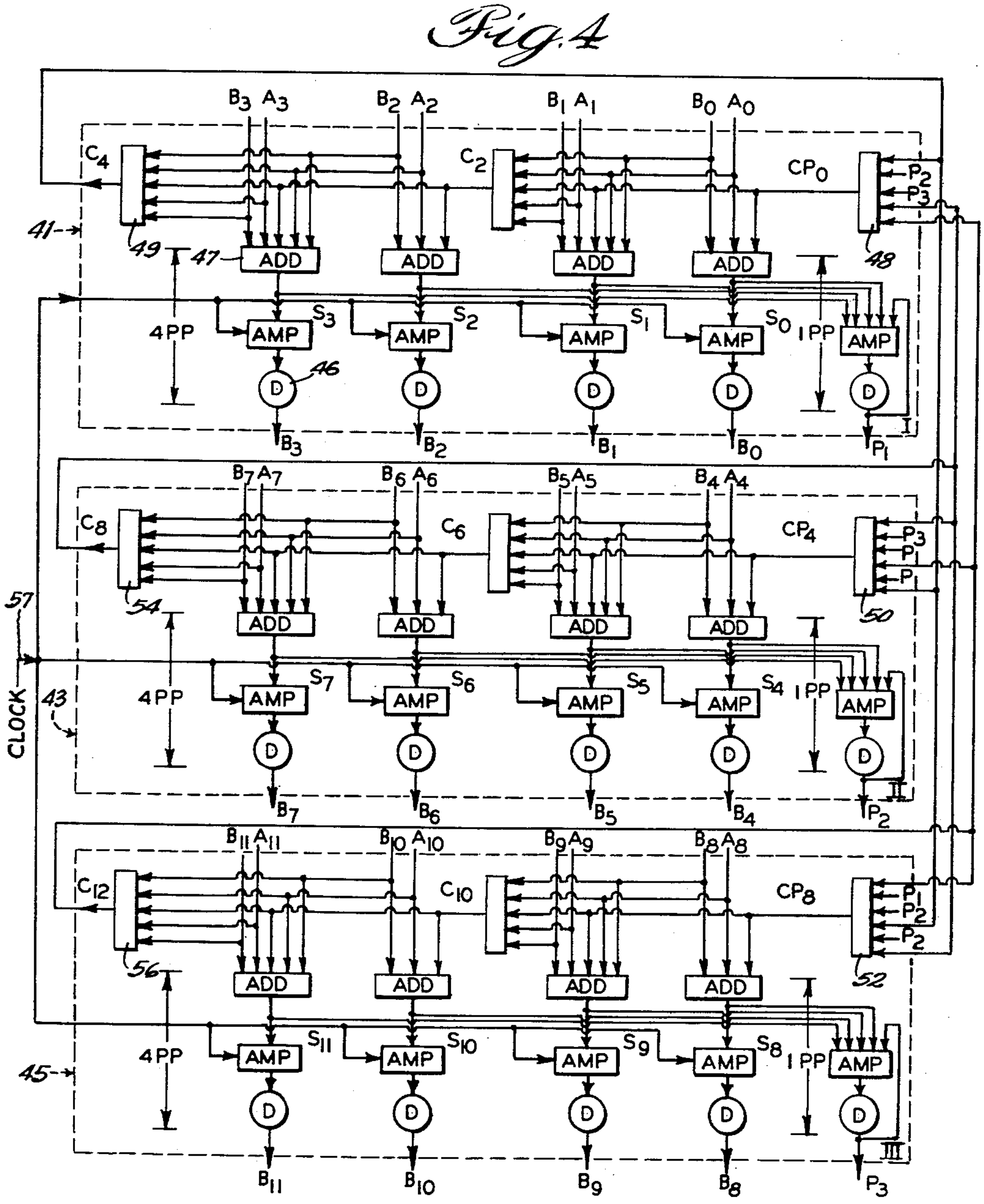
FIGURE 4 is a schematic diagram of an illustrative parallel-serial-parallel accumulator embodying the present invention.

A parallel-serial-parallel accumulator having three four-bit parallel adder stages 41, 43, and 45, one for each major character, constructed in accordance with the above-described principles, is shown in FIGURE 4 of the drawing. In this illustrative accumulator, the number of carries handled simultaneously in an adder stage from the previous stages, or $Nc$, is equal to 2; there are only two carry functions to implement, the other two being anticipated. Each adder stage, such as stage 41, comprises four add circuits 47, each adapted to receive a pair of inputs from the major characters to be added. In addition, each add circuit 47 receives carry inputs from previous circuits, and the output sum bit of each add stage 47 is fed through an amplifier-delay section including an amplifier 44 and a delay device 46, to provide the sum bits of the adder stage.

Assume that the input operands from two parallel-serial-parallel registers are $A_0, A_1, A_2, \ldots A_{11}$, and $B_0, B_1, B_2, \ldots B_{11}$, with $A_0$–$A_3$, $B_0$–$B_3$ being the inputs to the first major character, $A_4$–$A_7$, $B_4$–$B_7$ the input to the second major character, and $A_8$–$A_{11}$, $B_8$–$B_{11}$ the input to the third major character. Further assume that register B ($B_0$–$B_{11}$) is also the output of the adder storage register S that any output of the adder $S_0$–$S_{11}$ appears at $B_0$–$B_{11}$ four pulse periods later. Implement $C_2$, $C_4$, $C_6$, $C_8$, $C_{10}$, $C_{12}$, the carry functions from the add circuits for $S_1$, $S_3$, $S_5$, $S_7$, $S_9$, and $S_{11}$, respectively. The sum shall be $S_0, S_1, S_2, \ldots S_{11}$, corresponding to $A_0, A_1, A_2, \ldots A_{11}$; $B_0, B_1, B_2, \ldots B_{11}$, respectively.

Three logical functions $P_1$, $P_2$, $P_3$ are necessary to sense the three major characters for all binary ones, and three carry propagate functions, CP0, CP4, and CP8 are necessary to propagate the major character carries to other major characters. Assume that "reshape" clock signals are available from the clock line 57 to allow synchronization of the bits stored serially in the sub-registers. The outputs of registers A(11) and B(11) are added in each major character adder during clock times $t1$–$t4$, and that at clock time $t5$, the major character end carries from C4, C8, and C12 are propagated through CP0, CP4, and CP8. The logical statements for the entire parallel-serial-parallel adder follows:

$$S_0 =(\overline{A_0B_0}+A_0B_0)CP0+(\overline{A_0}B_0+A_0\overline{B_0})\overline{CP0}$$

$$S_1 =(\overline{A_1}\,\overline{B_1}+A_1B_1)(CP0A_0+CP0B_0+A_0B_0) +(\overline{A}_1B_1+A_1\overline{B}_1)(\overline{CP0}\overline{A}_0+\overline{CP0}\overline{B}_0+\overline{A}_0\overline{B}_0)$$

$$S_2 =(\overline{A}_2{:}\overline{B}_2+A_2.B_2)C_2+(\overline{A}_2B_2+A_2\overline{B}_2)\overline{C}_2$$

$$S_3 =(\overline{A}_3{:}\overline{B}_3+A_3B_3)(C_2,\ A_2+C_2B_2+A_2B_2) +(\overline{A}_3B_3+A_3\overline{B}_3)(\overline{C}_2\overline{A}_2+\overline{C}_2\overline{B}_2+\overline{A}_2\overline{B}_2)$$

$$S_4 =(\overline{A_4B_4}+A_4B_4)CP_4+(\overline{A_4}B_4+A_4\overline{B_4})\overline{CP_4}$$

$$S_5 =(\overline{A}_5\overline{B}_5+A_5B_5)(CP_4A_4+CP_4B_4+A_4B_4) +(\overline{A}_5B_5+A_5\overline{B}_5)(\overline{CP_4A_4}+\overline{CP_4B_4}+\overline{A_4}+\overline{B_4})$$

$$S_6 =(\overline{A}_6\overline{B}_6+A_6B_6)C_6+(\overline{A}_6B_6+A_6\overline{B}_6)\overline{C}_6$$

$$S_7 =(\overline{A}_7\overline{B}_7+A_7B_7)(C_6A_6+C_6B_6+A_6B_6) +(A_7\overline{B}_7+\overline{A}_7B_7)(\overline{C}_6\overline{A}_6+\overline{C}_6\overline{B}_6+\overline{A}_6\overline{B}_6)$$

$$S_8 =(\overline{A}_8\overline{B}_8+A_8B_8)CP_8+(\overline{A}_8B_8+A_8\overline{B}_8)\overline{CP_8}$$

$$S_9 =(\overline{A}_9\overline{B}_9+A_9B_9)(CP_8A_8+CP_8B_8+A_8B_8) +(\overline{A}_9B_9+A_9\overline{B}_9)(\overline{CP}_8\overline{A}_8+\overline{CP}_8\overline{B}_8+\overline{A}_8\overline{B}_8)$$

$$S_{10} =(\overline{A}_{10}\overline{B}_{10}+A_{10}B_{10})C_{10}+(\overline{A}_{10}B_{10}+A_{10}\overline{B}_{10})\overline{C}_{10}$$

$$S_{11} =(\overline{A}_{11}\overline{B}_{11}+A_{11}B_{11})(C_{10}A_{10}+C_{10}B_{10}+A_{10}B_{10}) +(\overline{A}_{11}B_{11}+A_{11}\overline{B}_{11})(\overline{C}_{10}\overline{A}_{10}+\overline{C}_{10}\overline{B}_{10}+\overline{A}_{10}\overline{B}_{10})$$

$$C_2 =(CP0+A_0)(CP0+B_0)(A_0+B_0)(A_1+B_1)+A_1B_1$$

$$C_4 =(C_2+A_2)(C_2+B_2)(A_2+B_2)(A_3+B_3)+A_3B_3$$

$$C_6 =(CP_4+A_4)(CP_4+B_4)(A_4+B_4)(A_5+B_5)+A_5B_5$$

$$C_8 =(C_6+A_6)(C_6+B_6)(A_6+B_6)(A_7+B_7)+A_7B_7$$

$$C_{10} =(CP_8+A_8)(CP_8+B_8)(A_8+B_8)(A_9+B_9)+A_9B_9$$

$$C_{12} =(C_{10}+A_{10})(C_{10}+B_{10}) (A_{10}+B_{10})(A_{11}+B_{11})+A_{11}B_{11}$$

$$CP0=t5C4P2P3+t5C8P3+C4\overline{t5}+C12t5$$

$$CP4=t5C8P3P1+t5C12P1+C8\overline{t5}+C4t5$$

$$CP8=t5C12P1P2+t5C4P2+C12\overline{t5}+C8t5$$

$$P_1 =S0S1S2S3(P1+t1)$$

$$P_2 =S4S5S6S7(P2+t1)$$

$$P_3 =S8S9S10S11(P3+t1)$$

In an attempt to keep the above logic general, the clock phase with which functions are clocked and those which are asynchronously cascaded are not defined.

In accordance with further features of this invention, the parallel-serial-parallel principles may be utilized for the comparison of two numbers stored in two parallel-serial-parallel registers, which comparison can be executed in essentially one word cycle. Using the same conditions assumed previously for the parallel-serial-parallel accumulator of FIGURE 4, the contents of two registers, A0–A11 and B0–B11, each storing 48 bits with 12 bits at a time appearing at a given period for four successive pulse times can be compared.

Figure 5:
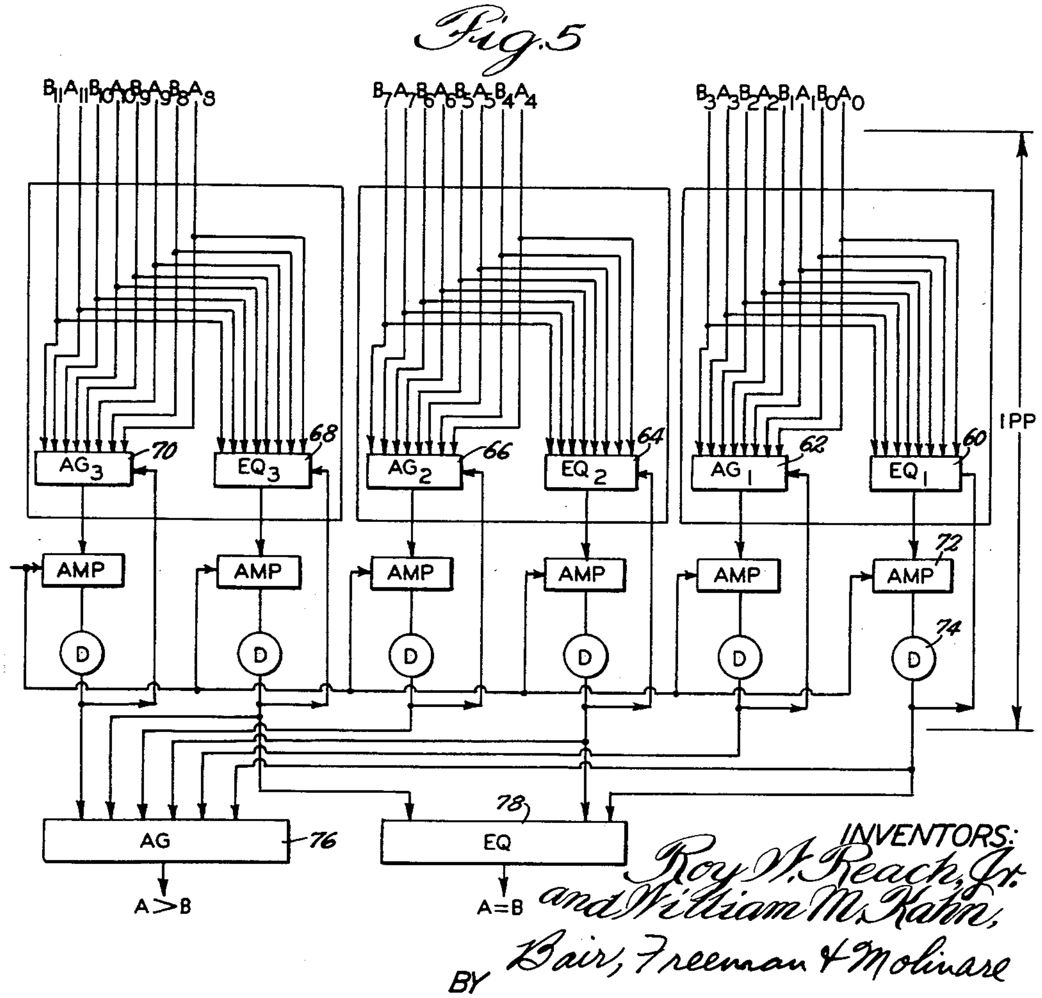
FIGURE 5 is a schematic diagram illustration of a comparator for two numbers stored in two parallel-serial-parallel registers in accordance with the invention.

This is accomplished in accordance with the embodiment of this invention shown in FIGURE 5 by implementing the logical statement that says that the minor character on the A input is less than the minor character on the B input. If this occurs, a one is stored in the AG1 one bit register 62. If, however, the minor character on the A input is not less and is not identically equal to the minor character on the B input, a zero is stored in the AG1 one bit register 62. If the two minor characters are identical and equal to each other, then the bit previously stored is retained. Simultaneously, another logical function control sets a one into the EQ1 one bit storage register 60 if any minor character on the A input is not equal to the corresponding minor character on the B input.

Thus, if the storage element is "ON" after a one-word cycle, three separate one-bit storage elements show whether or not each of the major characters on the A bus is equal to or less than the corresponding major characters on the B bus, and three other one-bit storage elements show whether or not the major characters are identical. The logical combination of these elements can be implemented to produce a single output that represents equality or the relative magnitude of the entire words being compared.

In the comparison circuit shown in FIGURE 5 of the drawing, 48 bits of the machine word are transmitted twelve bits at a time, on each of two input busses A and B for four successive pulse periods. Four and one half pulse periods after the first set of digits are available, a comparison of each major character for equality is contained in three functions and for magnitude is contained in six functions. These functions are then reduced to single output lines EQ and AG, five pulse periods after the first set of digits are available on the busses.

EQ is active if the 48 bits on the A bus are identical to those on the B bus, and AG is active if the operand on the A bus is greater than the operand on the B bus. At the time that the single output lines EQ and AG become active, the first digits of another pair of operands may be presented to the comparison circuitry via the A and B busses giving a repetitive rate of four pulse periods to the circuitry.

Representative logic for implementing this comparison circuitry may be as follows:

$$AG3=(A11+\overline{B11})+(A11+\overline{B11})(A10+\overline{B10})$$
$$+(A11+\overline{B11})(A10+\overline{B10})(A9)(\overline{B9})$$
$$+(A11+\overline{B11})(A10+\overline{B10})(A9+\overline{B9})$$
$$(A8+\overline{B8})(A8+AG3)(\overline{B8}+AG3)$$

$$EQ3=(\overline{A11}+\overline{B11})(A11+B11)+(\overline{A10}+\overline{B10})$$
$$(A10+B10)+(\overline{A9}+\overline{B9})(A9+B9)$$
$$+(\overline{A8}+\overline{B8})(A8+B8)+(\overline{t1}+\overline{4n})(EQ3)$$

$$AG2=(A7+\overline{B7})+(A7+\overline{B7})(A6+\overline{B6})+(A7+\overline{B7})$$
$$(A6+\overline{B6})(A5)(\overline{B5})+(A7+\overline{B7})$$
$$(A6+\overline{B6})(A5+\overline{B5})(A4+\overline{B4})$$
$$(A4+AG2)(\overline{B4}+AG2)$$

$$EQ2=(\overline{A7}+\overline{B7})(A7+B7)+(\overline{A6}+\overline{B6})(A6+B6)$$
$$+(\overline{A5}+\overline{B5})(A5+B5)+(\overline{A4}+\overline{B4})$$
$$(A4+B4)+(\overline{t1}+\overline{4n})(EQ2)$$

$$AG1=(A3+\overline{B3})+(A3+\overline{B3})(A2+\overline{B2})+(A3+\overline{B3})$$
$$(A2+\overline{B2})(A1+\overline{B1})+(A3+\overline{B3})$$
$$(A2+\overline{B2})(A1+\overline{B1})(A0+\overline{B0})$$
$$(A0+AG1)(\overline{B0}+AG1)$$

$$EQ1=(\overline{A3}+\overline{B3})(A3+B3)+(\overline{A2}+\overline{B2})(A2+B2)$$
$$+(\overline{A1}+\overline{B1})(A1+B1)+(\overline{A0}+\overline{B0})$$
$$(A0+B0)+(\overline{t1}+\overline{4n})(EQ1)$$

$$\mathrm{AG}=(EQ3+AG3)+(\overline{EQ3})(EQ2)(AG2)$$
$$+(\overline{EQ3})(EQ2)(EQ1)(AG1)$$

$$EQ=(\overline{EQ1})(\overline{EQ2})(\overline{EQ3})$$

Those skilled in the art will appreciate that other logical elements such as shifting a parallel-serial-parallel register either left or right, forming the logical product or sum of the bits of two registers, complementing, and transferring, may be effected in accordance with the above-described principles of the invention. Each operation is analogous to the way such operations would be implemented in a parallel system except that a number of pulse periods equal to the number of bits stored serially in one stage are required to perform the operation. However, only the reciprocal of this number of pulse periods, as much logical circuitry is required to accomplish this end since time sharing of transfer busses, logical gating, negating, etc., is possible.

In view of the teachings set forth above, considerable economies can be realized in the construction of a parallel-serial-parallel system, and by proper arrangement of the bits in the small serial sub-registers, addition times can be made to approach, and to exceed in some cases, the addition times of a parallel adder using the same physical components. Other logical operations such as compare, shift, logical products, sums, complementing, and transferring present no particular difficulties due to the unique arrangement of the bits. The system of the invention provides the advantages of keeping the number of logical circuits smaller for a given number of bits manipulated than a parallel system requires, and keeping the storage cost per bit in the system registers as small as possible, all without substantially affecting addition speeds, as in the case of a parallel-serial system.

Although several exemplary circuits have been shown and described hereinabove, for the purpose of illustrating the principles of the invention, it will be fully understood by those skilled in the art that modifications may be made in the construction and arrangement of the circuits without departing from the real spirit of the invention, and that it is intended to cover by the appended claims any modified forms of structure or use of equivalents which may reasonably be included within their scope.

What is claimed as the invention is:

1. The improvement of data processing apparatus for machine words of the type having a plurality of data bits grouped into major characters, each formed of a plurality of minor characters, comprising a plurality of closed loop serial sub-registers, each including amplifying and delay means for enabling a plurality of bits to be stored therein; means connecting said serial sub-registers into groups corresponding to each major character and for writing, in a serial manner, into each serial sub-register in each group one bit from each of the minor characters forming the major character associated with the group, and means for reading, in a parallel manner, all of the bits of a minor character from the serial sub-registers of each major character group, whereby a plurality of minor character bits are made available simultaneously from said serial sub-registers.

2. The improvement of data processing apparatus for machine words of the type having a plurality of data bits grouped into major characters, each formed of a plurality of minor characters, comprising a plurality of closed loop serial sub-registers each adapted to store a plurality of bits therein; means connecting said serial sub-registers into groups corresponding to each major character, means for writing into each serial sub-register in each group, one bit from each of the minor characters forming the major character associated with the group, and means for reading all of the bits of a minor character from the serial sub-registers of each major character group, whereby a plurality of minor character bits are made available simultaneously from said serial sub-registers.

3. The improvement of data processing apparatus for machine words of the type having a plurality of data bits grouped into major characters, each formed of a plurality of minor characters, comprising a plurality of closed loop serial sub-registers, means connecting said serial sub-registers into groups corresponding to each major character, means for writing into each serial sub-register of a major character group, one bit from each of the minor characters forming the major character associated with the group, and means for reading simultaneously all of the bits of a minor character from the serial sub-registers of the major character group.

4. The improvement of a data processing accumulator for adding pairs of machine words, each machine word being formed of a plurality of data bits grouped into major characters, wherein each major character is formed of a plurality of minor characters, said accumulator comprising a plurality of closed loop serial sub-registers, each comprising amplifying and delay means for enabling a plurality of bits to be stored therein; means connecting said serial sub-registers into groups corresponding to each major character and for writing, in a serial manner, into each serial sub-register in each group the sum bit of each pair of corresponding bits in each of the minor characters forming the major character associated with the group, means for propagating carry bits through said sub-registers as determined by the sum bits, and means for reading, in a parallel manner, all of the sum bits of the added pairs of minor characters from the serial sub-registers of each major character group, whereby a plurality of minor character sum bits are made available simultaneously from said serial sub-registers.

5. The improvement of data processing apparatus for processing machine words of the type having bits grouped into a plurality of major characters, each formed of a plurality of minor characters, comprising a plurality of serial registers, for each major character, amplifier and delay means in each serial register for storing one bit from each of the minor characters associated with the major character such that the bits forming the first major character are stored in a first group of said serial registers, the bits forming the second major character are stored in a second group of said serial registers, etc., and means for simultaneously reading out, from said serial registers, one minor character of each major character whereby a plurality of minor characters are available simultaneously for further processing, the total access time for the machine word being dependent upon the number of minor characters in a major character.

6. The improvement of data processing apparatus for processing machine words of the type having bits grouped into major characters, with each major character being formed of a plurality of minor characters, comprising a plurality of serial multi-bit registers for each major character in the machine word, amplifier and delay means in each serial register for storing one bit from each of the minor characters in a major character, such that each serial register stores a number of bits equal to the number of minor characters in the major character, and means for simultaneously reading out from the serial registers of a major character, all of the bits of a minor character whereby a plurality of minor characters are made available in sequential order, the total access time for the machine word being defined by the number of minor characters in a major character.

7. The improvement of data processing accumulating apparatus for adding pairs of machine words of the type having bits grouped into a plurality of major characters, each major character being formed of a plurality of multi-bit minor characters, comprising a plurality of adder stages, one for each major character, each of said stages including a plurality of serial registers equal in number to the number of bits in a minor character, means for summing corresponding bits in the minor characters of the pairs of machine words to be added and for applying the sum bits to said serial registers, whereby each of said serial registers is adopted to store a plurality of sum bits equal in number to the number of minor characters in a major character, and means for simultaneously reading out from said serial registers, one minor character sum from each major character adder stage whereby a plurality of minor character sums are available simultaneously.

8. The improvement of a data processing accumulator for adding pairs of machine words of the type having bits grouped into a plurality of major characters, each formed of a plurality of minor characters, comprising an adder stage for each major character, each adder stage comprising the serial combination of an add circuit and a multi-bit storage register for each bit of a minor character in the major character such that the bits forming the first major characters are added and stored in a first group of said add circuits and serial registers, the bits forming the second major characters are added and stored in a second group of said add circuits and serial registers, etc., means connected to the inputs of said add circuits for propagating carry bits through said adder stages, and means for simultaneously reading out from said serial registers, the minor character sum bits of each major character, whereby a plurality of minor character sums are available simultaneously.

9. In a data processing system for use with machine words of the type having data bits grouped into a plurality of major characters, each formed of a plurality of minor characters, the improvement of a parallel-serial-parallel accumulator comprising an accumulator stage for each pair of major characters of the machine word to be added, each accumulator stage including a plurality of adder circuits having delay and storage means connected to the output thereof, means for applying the minor character bits to be added in said accumulator stage to said adder circuits, the bits of each pair of minor characters to be added being applied simultaneously to their corresponding adder circuits, the various minor characters forming the major character being added serially in said accumulator stage, carry means for sensing the carries required between the adder circuits and for applying carry bits, when required, to said adder circuits together with the minor character bits, means applying the sum bits resulting from the addition of the minor characters to the delay and storage means, and means connecting the carry output bits from each accumulator stage to the other accumulator stages whereby the sum bits at the outputs of the delay and storage means represent the sum of the two machine words added by the parallel-serial-parallel accumulator.

10. In a data processing system for use with machine words of the type having data bits grouped into a plurality of major characters, each formed of a plurality of minor characters, the improvement of a parallel-serial-parallel accumulator comprising an accumulator stage for each pair of major characters of the machine words to be added, each accumulator stage including a plurality of adder circuits having delay and storage means connected to the output thereof, means for applying the minor character bits to be added in said accumulator stage to said adder circuits, the bits of each pair of minor characters to be added being applied simultaneously to their corresponding adder circuits, the various minor characters forming the major character being added serially in said accumulator stage, carry means for feeding the end carry bit from each accumulator stage, end around, to the succeeding accumulator stage, and means applying the sum bits resulting from the addition of the minor characters to the delay and storage means whereby the sum bits at the outputs of the delay and storage means represent the sum of the two machine words added by the parallel-serial-parallel accumulator.

11. The improvement of a parallel-serial-parallel accumulator for adding data bits grouped into a plurality of major characters, each formed of a plurality of minor characters, comprising an accumulator stage for each pair of major characters to be added, each accumulator stage including a plurality of adder circuits, means for applying the data bits to said adder circuits, the bits of each pair of minor characters to be added being applied simultaneously to their corresponding adder circuits, the various pairs of minor characters forming the major characters being added serially in said accumulator stage, carry means for applying carry bits to said adder circuits together with the minor character bits, and means for reading out the sum bits resulting from addition of the minor characters in serial fashion from each accumulator stage.

12. The improvement of a parallel-serial-parallel accumulator for adding data bits grouped into a plurality of major characters, each formed of a plurality of minor characters, comprising an accumulator stage for each pair of major characters to be added, each accumulator stage including a plurality of adder circuits, means for applying the data bits to said adder circuits, the bits of each pair of minor characters to be added being applied simultaneously to their corresponding adder circuits, the various pairs of minor characters forming the major character being added serially in said accumulator stage, carry means for applying from each accumulator stage carry bits resulting from the major character addition in the accumulator stage end around to the succeeding accumulator stage to be added to the minor character bits for producing sum bits in each stage representative of the minor character additions therein, and means for reading out the sum bits resulting from the addition of the minor characters in serial fashion.

13. An accumulator for adding machine words of the type having data bits grouped into a plurality of major characters, each formed of a plurality of minor characters comprising an accumulator stage for each pair of major characters of the machine words to be added, each accumulator stage including a plurality of adder circuits, means for applying the minor character bits to be added to said adder circuits, the bits of each pair of minor characters to be added being applied simultaneously to their corresponding adder circuits, the various pairs of minor characters forming the major character being added serially in said accumulator stage, means for sensing the major character bits in each accumulator stage at the completion of a major character addition, and means for applying the carry output bits from a major character accumulator stage to a succeeding major character accumulator stage when the major character sensed is equal to one less than the radix of the major character.

14. An accumulator in accordance with claim 13 wherein the accumulator stages operate in the decimal system and wherein a carry output bit is applied from one accumulator stage to a succeeding stage only when the major character sensed in the first stage comprises all decimal nines.

15. An accumulator in accordance with claim 13 wherein the accumulator stages operate in the binary system and wherein a carry output bit is applied from one accumulator stage to a succeeding stage only when the major character sensed in the first stage comprises all binary ones.

16. A parallel-serial-parallel accumulator for adding machine words of the type having data bits grouped into a plurality of major characters, each formed of a plurality of minor characters, comprising an accumulator stage for each pair of major characters of the machine words to be added, each accumulator stage including a plurality of adder circuits having delay and storage means connected to the output thereof, means for applying the minor character bits to be added to said adder circuits, the bits of each pair of minor characters to be added being applied simultaneously to their corresponding adder circuits, the various minor characters forming the major character being added serially in said accumulator stage, means applying the sum bits resulting from the addition of the minor characters to the delay and storage means, and means for sensing the major character bits in each accumulator stage at the completion of a major character addition and for applying carry bits from an accumulator stage to a succeeding accumulator stage when the major character sensed is equal to one less than the radix of the major character.

17. In a data processing system for use with machine words of the type having data bits grouped into a plurality of major characters, each formed of a plurality of minor characters, the improvement of a parallel-serial-parallel accumulator comprising an accumulator stage for each pair of major characters of the machine word to be added, each accumulator stage including a plurality of adder circuits, means for applying the minor character bits to be added to said adder circuits, the bits of each pair of minor characters to be added being applied simultaneously to their corresponding adder circuits, the various minor characters forming the major character being added serially in said accumulator stage, timing means connected to said accumulator stages for completing each major character addition without carries in one word cycle, and for sensing every bit in each major character at the end of said one cycle to determine if any major character is equal to one less than the radix of the major character, and means responsive to the presence of major character end carries and to the presence of a major character equal to one less than the radix of the major character for effecting all carries in a second word cycle, whereby the complete addition is effected in two word cycles.

18. In a data processing system for use with machine words of the type having data bits grouped into a plurality of major characters, each formed of a plurality of minor characters, the improvement of a parallel-serial-parallel comparator for comparing a first major character with a second major character comprising a minor character magnitude register and a minor character equality register for each pair of corresponding minor characters to be compared, means for simultaneously applying the bits of each pair of corresponding minor characters to their associated magnitude and equality registers whereby said magnitude register stores a one bit if the first minor character is less than the second minor character or a zero bit if the first minor character is greater than the second minor character, or if the minor characters are equal, the magnitude register retains the previous bit, and said equality register stores a one bit if the first and second minor characters are unequal, a major character magnitude register connected to the output of each of said minor character magnitude and equality registers and responsive to the bits stored therein for indicating whether the first major character is equal to or less than the second major character, and a major character equality register connected to the output of the minor character equality registers for indicating whether the first and second major characters are equal.

19. A parallel-serial-parallel comparator in accordance with claim 18 wherein storage and delay means are connected between each minor character magnitude or equality register and said major character magnitude register such that the major characters to be compared may be applied sequentially to said minor character registers and the outputs thereof stored in the storage and delay means to enable the comparison of two machine words to be completed during one word cycle.

No references cited.